United States Patent [19]

Fake

[11] Patent Number: 5,076,600
[45] Date of Patent: Dec. 31, 1991

[54] BICYCLE TRAILER

[75] Inventor: Albert K. Fake, Halifax, Pa.

[73] Assignee: Toddle Totter, Inc., Halifax, Pa.

[21] Appl. No.: 584,119

[22] Filed: Sep. 18, 1990

[51] Int. Cl.[5] .............................. B60D 1/32; B62J 7/04
[52] U.S. Cl. ................................ 280/204; 280/304.3; 280/489
[58] Field of Search ...................... 280/202, 204, 304.3, 280/472, 479.3, 78, 47.3, 47.32, 489, 494, 499, 292, 32.7; 224/30 R, 31, 32 R, 33 R, 42.03 B

[56] References Cited

U.S. PATENT DOCUMENTS

| 2,271,255 | 1/1942 | Du Bois | 280/489 |
|---|---|---|---|
| 2,334,387 | 3/1942 | Curty | 280/204 |
| 3,848,890 | 11/1974 | Macalpine | 280/204 |
| 3,909,042 | 9/1975 | Miller . | |
| 4,077,646 | 3/1978 | Watkins | 280/204 |
| 4,266,793 | 5/1981 | Pryor . | |
| 4,342,467 | 8/1982 | Kester . | |
| 4,381,117 | 4/1983 | French | 280/204 |
| 4,413,835 | 11/1983 | Harelett . | |
| 4,756,541 | 7/1988 | Albitre . | |
| 4,798,399 | 1/1989 | Cameron | 280/304.3 |

FOREIGN PATENT DOCUMENTS

| 0657455 | 2/1963 | Canada | 280/204 |
|---|---|---|---|
| 0794900 | 2/1936 | France | 280/204 |
| 0829779 | 7/1938 | France | 280/204 |
| 0208115 | 3/1940 | Switzerland | 280/204 |
| 0422768 | 1/1935 | United Kingdom | 280/204 |

Primary Examiner—Charles A. Marmor
Assistant Examiner—Anne Marie Boehler
Attorney, Agent, or Firm—Fleit, Jacobson, Cohn, Price, Holman & Stern

[57] ABSTRACT

The combination of a bicycle and a trailer therefore is provided including a pivotal coupling between the bicycle and the trailer allowing for relative inclination of the trailer and bicycle about an horizontal axis transverse to the bicycle and turning movement of the trailer relative to the bicycle about an upstanding pivot axis stationary with the trailer. The pivot connection further includes structure, by which upon relative turning angular displacement of the bicycle and trailer of approximately 45 degrees, angular displacement of the upstanding axis of relative turning movement of the bicycle and trailer may not be freely pivoted about a horizontal axis transverse to the bicycle. Also, the trailer is of light weight construction and includes a low interior compartment in which at least one child's seat is mounted with the child's weight supporting seat area of the child's seat disposed at an elevation below the axes of rotation of the trailer wheel and the rear wheel of the bicycle, the interior compartment of the trailer being bounded by structural bars of the trailer.

16 Claims, 3 Drawing Sheets

BICYCLE TRAILER

BACKGROUND OF THE INVENTION

1. Field of the Invention

This invention relates to a single wheel trailer to be trailed behind a bicycle and which includes a heavily protected, low center of gravity interior compartment in which one or more safety seats for children may be received and the trailer includes hitch structure for co-action with complimentary hitch structure on an attendant bicycle which assures that the combination of the bicycle and trailer will remain upright when unattended (during removal of children from, or the placement of children in, the trailer) as long as the bicycle is turned more than 45 degrees relative to the trailer.

2. Description of Related Art

Various different forms of bicycle trailers heretofore have been provided including some of the general structural and operational features of the instant invention. Examples of these previously known forms of bicycle trailers are disclosed in U.S. Pat. Nos. 3,909,042, 4,266,793, 4,342,467, 4,413,835 and 4,756,541.

However, these previously known forms of trailers do not include specific improvements incorporated in the instant invention which give rise to advantages of operation.

SUMMARY OF THE INVENTION

Some persons, when riding a bicycle, carry small children in backpack type carriers or infant seats strapped to their backs. This manner of taking a small child or infant for a ride may be helpful, but it presents considerable danger in the event the bicycle rider experiences difficulty resulting in upset. Accordingly, a need exists for an apparatus by which infants and small children safely may be taken for a bicycle ride by their parents and other persons authorized to do so.

The main object of this invention is to provide a trailer for use in conjunction with a bicycle and constructed in a manner enabling one or more small children or infants to be supported therefrom in a manner offering considerable protection to the occupants of the trailer against injury do to upset.

Another object of this invention is to provide a trailer having a tongue portion incorporating hitch structure which will coact with specially designed co-acting hitch structure on a bicycle to maintain the trailer (provided with only a single rear wheel) upright when being trailed behind a bicycle and which will cause the trailer to lean to a degree slightly less than lean experienced by the associated bicycle when the combination of the bicycle and trailer are executing a gradual turn.

Another very important object of this invention is provide a bicycle trailer in accordance with the preceding objects and which is of light weight construction and which utilizes only a single support wheel to thereby maintain the additional effort which must be exerted by the rider of the associated to a minimum.

A further object of this invention is to provide a bicycle trailer including structure which will protect the occupants of the trailer against water spray from the rear wheel of the associated bicycle.

Yet another object of this invention is to provide a bicycle trailer including a front retractable stand which may be used to support the trailer in an upright position when the trailer is not operatively coupled to an associated bicycle hitch.

Another important object of this invention is to provide a bicycle in accordance with the preceding objects and which includes a small child and infant receiving area which is not fully enclosed but which will offer considerable protection against injury in the event of upset and which will further prevent a small child or infant from extending his or her arms beyond the sides of the trailer.

A further object of this invention is to provide, in conjunction with a single wheel bicycle trailer, hitch structure for operatively connecting the tongue portion of the bicycle trailer to the rear of a bicycle in a manner such that the bicycle and trailer will be supported from each other in upright position as long as the bicycle is turned at least approximately 45 degrees relative to the trailer.

Still another object of this invention is to provide a single wheel bicycle trailer with infant support means disposed at an elevation below the axis of rotation of the single trailer wheel.

A final object of this invention to be specifically enumerated herein is to provide a bicycle trailer in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
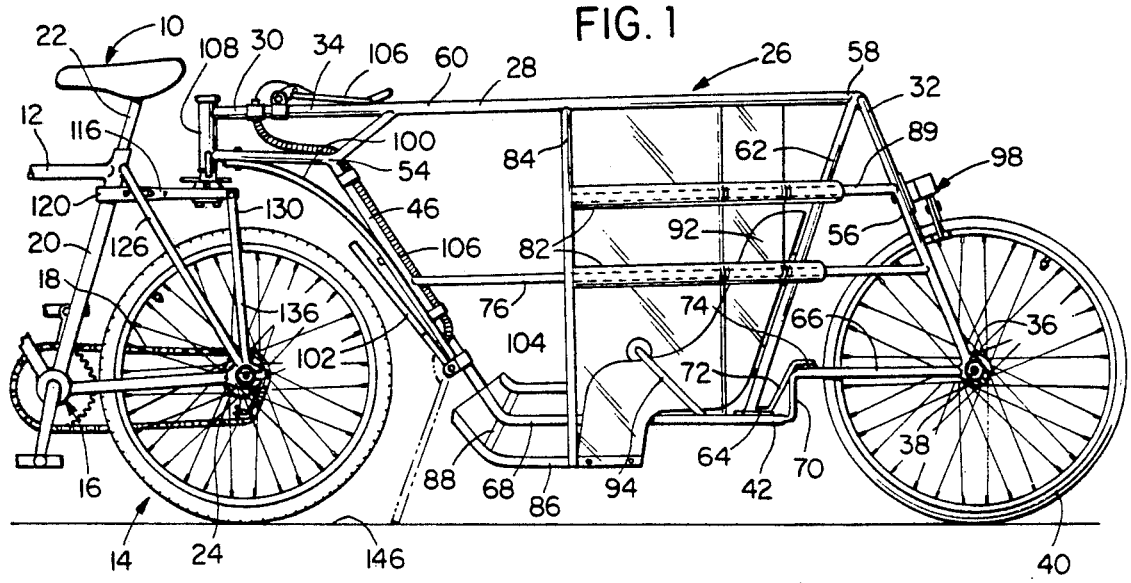
FIG. 1 is a side elevational view of first form of bicycle trailer constructed in accordance with the present invention and with the tongue portion of the trailer operatively coupled to the rear of an associated bicycle through utilization of hitch structure also comprising a part of the invention.
Figure 2:
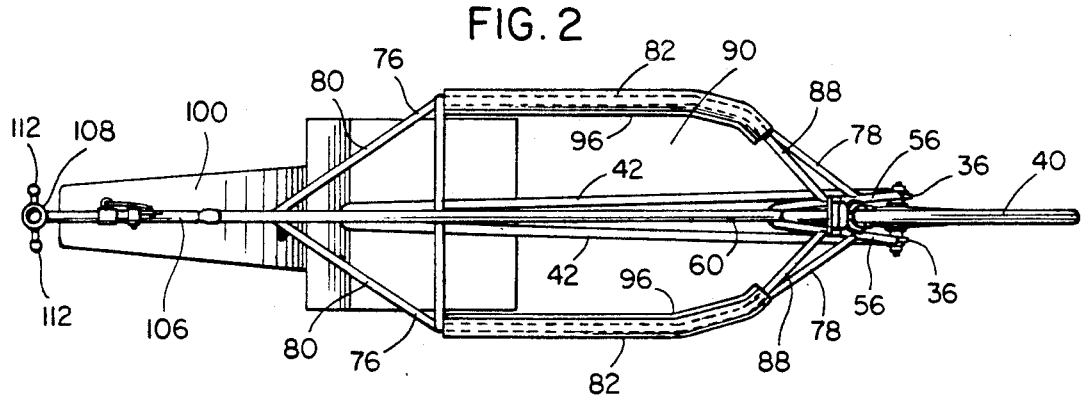
FIG. 2 is a top plan view of the trailer illustrated FIG. 1.
Figure 3:
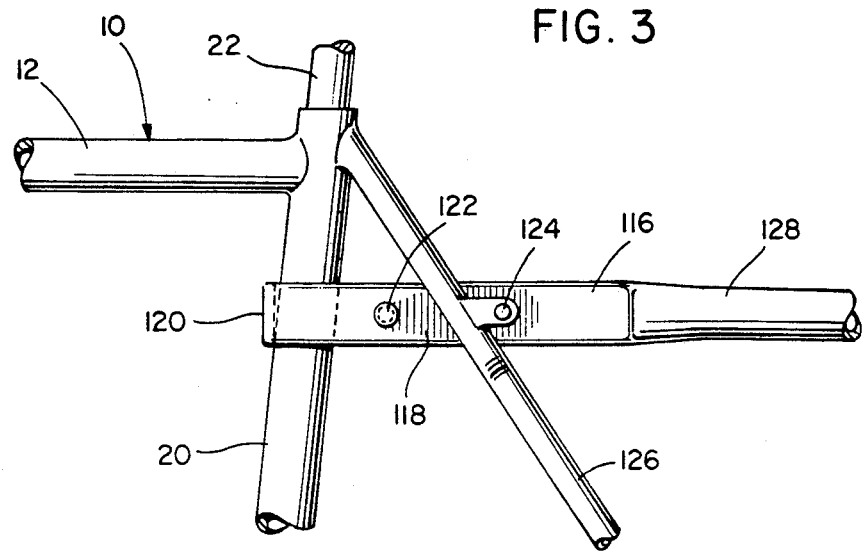
FIG. 3 is a fragmentary enlarged side elevational view of the seat shank mounting portion of the bicycle and illustrating the manner in which a portion of the bicycle hitch structure is mounted from the bicycle frame.
Figure 4:
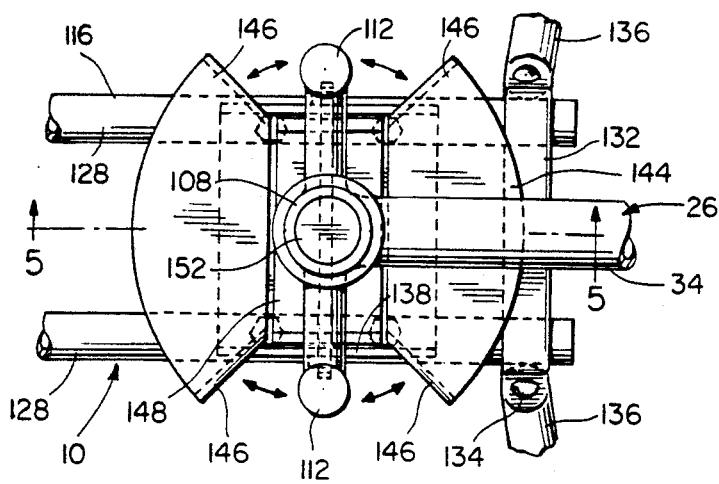
FIG. 4 is a fragmentary enlarged top plan view of the hitch construction operatively connecting the tongue portion of the trailer to the associated bicycle.
Figure 5:
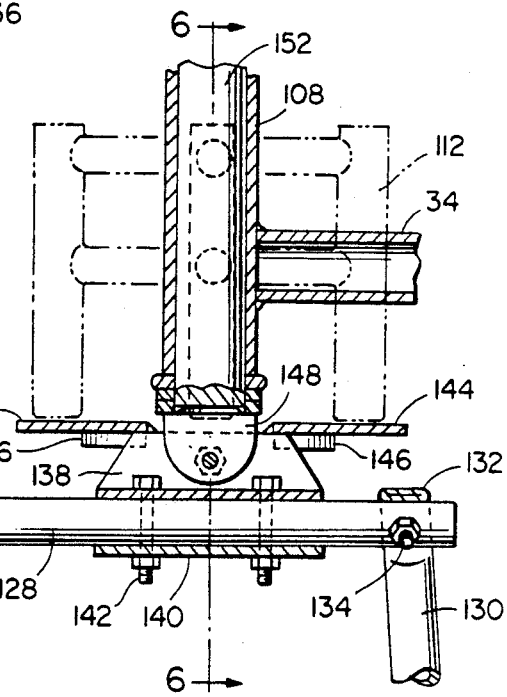
FIG. 5 is a fragmentary vertical sectional view taken substantially upon the plane indicated by the section line 5—5 of FIG. 4 and with alternate turned positions of the tongue of the trailer illustrated in phantom lines.
Figure 6:
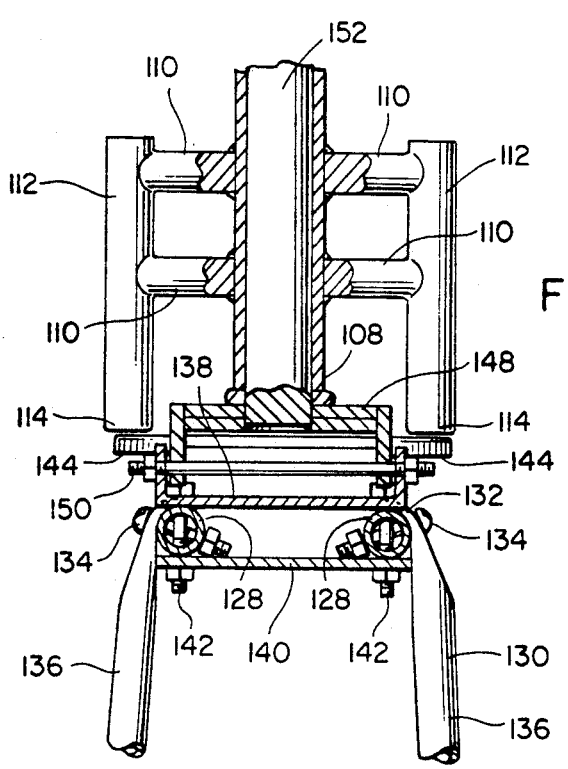
FIG. 6 is a fragmentary vertical sectional view taken substantially upon the plane indicated by the sectional line 6—6 of FIG. 5.

Referring now more specifically to the drawings the numeral 10 generally designates a conventional form (but slightly modified) of bicycle including a frame 12 from which a single rear wheel assembly generally referred to by the reference numeral 14 as journaled as well as a pedal crank assembly 16. The pedal crank assembly 16 is drivingly connected to the rear wheel assembly 14 by a drive chain 18 and the frame 12 includes a rear, rearwardly and upwardly inclined frame member 20 downwardly into whose upper end a seat shank support 22 is adjustably telescoped. The rear of the frame 12 includes opposite side mounting portions 24 from the which the rear wheel assembly 14 is journaled. It is to be noted that the preceding description of the bicycle 10 describes a conventional form of bicycle.

Referring now more specifically to FIG. 1, the reference numeral 26 generally designates a first form of trailer constructed in accordance with the present invention. The trailer 26 includes a main frame 28 having front and rear ends 30 and 32. The front end 30 of the frame 28 includes a forwardly directed upper tongue portion 34 and the rear end 32 includes a pair of lower opposite side mounting portions 36 between which a transverse axle assembly 38 is removably supported, the axle assembly journalling a rear support wheel 40.

Figure 7:
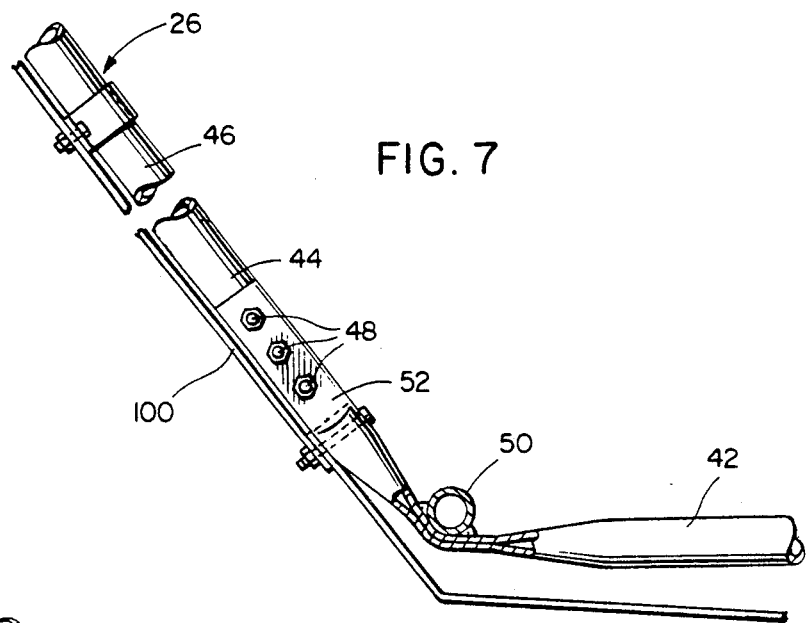
FIG. 7 is a fragmentary enlarged side elevational view of the lower forward portion of the trailer frame with parts thereof being broken away and illustrated in vertical section.

The main frame 28 includes front-to-rear extending lower frame portions 42 from whose rear ends the mounting portions 36 are supported and the front ends of the frame portions 42 are secured to opposite sides of the lower end 44 of a forwardly and upwardly inclined frame portion 46 as at 48, see FIG. 7. The front ends of the frame portions 42 are joined by a transverse tubular member 50 extending and secured therebetween and then are upwardly directed and flattened as at 52 for connection to the lower end of the frame portion 46 as at 48.

The upper end of the frame portion 46 is anchored to the tongue portion 34 as at 54 and a pair of rear, upwardly and forwardly inclined opposite side portions 56 are connected to the mounting portions 36 at their lower ends and are joined to the rear end 58 of an upper longitudinal frame portion 60 which extends forward from the upper ends of the opposite side portions 56 to the tongue portion 34. The main frame 28 also includes a rear, forwardly and downwardly inclined rear frame portion 62 extending downward from the rear end 58 of the frame portion 60 and anchored relative to a transverse connecting plate 64 extending between and interconnecting the frame portions 42 forward of the support wheel 40, the frame portions 42 including vertically offset upper rear portions 66 and lower front portions 68 interconnected by upstanding flattened sections 70 with an inclined brace 72 extending between the connecting plate 64 interconnecting the rear ends of the front portions 68 and a connecting plate 74 interconnecting the front ends of the rear portions 66, see FIGS. 1 and 8.

Still further, a pair of lower, opposite side, intermediate height and front-to-rear extending protective bars 76 are provided and are interconnected between mid-height portions of the opposite side portions 56 and mid-height portions of the front inclined frame portion 46, the bars 76 being outwardly bowed so as to include inwardly directed rear ends 78 anchored relative to the opposite side portions 56 and inwardly directed front ends 80 secured to opposite side mid-height portions of the inclined front inclined frame portion 46. Longitudinal mid-portions of the bars 76 include tubular padding members 82 disposed thereover and generally vertically disposed and outwardly bowed opposite side members 84 have their upper ends secured to longitudinal mid-portions of the frame portion 60 and their lower ends secured to opposite side skid bars 86 supported from the forward ends of the longitudinal frame portions 42 as at 88, the vertical height mid-portions of the members 84 being anchored relative to the bars 76 immediately forward of the tubular padding members 82.

Also provided are a pair of outwardly bowed upper protective bars 89 extending forward of the upper ends of the opposite side portions 56 above the support wheel 40 and anchored to the vertical mid-portions of the upper ends of the side members 84 disposed above the bars 76, the bars 89 also including tubular padding members 82.

Immediately forward of the frame portion 62, inward of the confines of the bars 76 and 88, is defined a protective area 90 in which a small child or infant seat is 92 is mounted any convenient manner, the seat 92 including a seat belt mechanism 94 and including a child or infant weight supporting seat area or portion disposed at an elevation below the axes of rotation of the wheel assembly 14 and the support wheel 40. Also, opposite side, contoured, impact resistant, clear plastic panels 96 are supported from the bars 76 and 88 in any convenient manner (not shown) and insure that the arms and hands of a child disposed within the seat 92 enclosed with in the protective area 90 may not extend outward of the bars 76 and 88, the front, top and rear of the protective area 90 being open for ventilation purposes.

The rear of the frame 28 may support an inertia switch operated and storage battery powered caliper brake assembly referred to in general by the reference numeral 98 of any conventional design. The assembly 98 will be operative to apply a braking action of the rear support wheel 40 responsive to the deceleration of the combination comprising the bicycle 10 and the trailer 26 above a predetermined magnitude, which braking magnitude must be less than the total braking magnitude which may be achieved by the brakes (not shown) of the bicycle 10.

A stationary rearwardly extending and downwardly curving splash shield 100 is supported beneath the tongue portion 34 and extends downwardly along the frame portion 46. In addition, a support stand 102 is pivotally supported from a lower portion of the frame portion 46 as at 104 and is under the control of an operating cable assembly 106 extending upward to the tongue portion 34 and actuated by an operating lever 106.

The forward end 30 of the tongue portion 34 includes a vertical sleeve 108 supported therefrom and the sleeve includes, adjacent its lower end, two pairs of vertically spaced, laterally outwardly projecting supports 110 and each of pair of vertically spaced supports 110 mounts a vertical rod 112 from its outer ends, the lower ends 114 of the rods 112 projecting below the lower end of the sleeve 108.

Referring now more specifically to FIG. 1 and 3-6, the bicycle 10 is slightly modified in that an upper horizontal and rearwardly projecting support 116 is provided comprising a tubular member bent into U-shape and flattened as at 118 in the area of the U-bend 120 thereof. The U-bend 120 passes about the upper end of the frame member 20 and is provided with a transverse fastener 122 rearward of the frame member 20. In addition, fasteners 124 are secured between rearwardly and downwardly inclined braces 126 extending between the upper end of the frame member 20 and the mounts 24 on opposite sides of the rear wheel assembly 14 and the rearwardly extending legs 128 of the support 116. Further, the rear ends of the legs 128 of the support 116 are supported through the utilization of an inverted U-shaped support 130 whose upper bight portion 132 is flattened and passes over the rear ends of the legs 128. In addition, the bight portion 132 is fastened to the legs 128 through the utilization of fasteners 134, the lower ends of the legs 136 of the U-shaped support 130 being secured to the mounts 24.

A longitudinally short channel member 138 is secured between the legs 128 forward of the bight portion 132 through the utilization of a clamp plate 140 and fasteners 142. The channel 138 overlies the legs 128 and the clamp plate 140 underlies the legs 128, the fasteners 142 being secured through the channel 138, the legs 128 and the clamp plate 140.

The opposite ends of the channel member 138 include horizontal, sector-shaped bearing plates 144 supported therefrom and spaced apart longitudinally of the channel 138. The arc ends of the bearing plates 144 are slightly downwardly curved as at 146 and it will be noted from FIG. 5 of the drawings that the upper surfaces of the bearing plates 144 are spaced slightly beneath the level of the lower extremities of the rods 112, when the bicycle 10 and trailer 126 are disposed upright on a horizontal surface 146.

An inverted U-shaped mount 148 is pivotally supported within the confines of the channel 138 through the utilization of a pivot bolt 150 and the mount 148 includes an upwardly pivot shank 152 upwardly rotably received within the sleeve 108. When the bicycle 10 and trailer 26 are longitudinally aligned, the rods 112 are spaced between opposing arc ends of the bearing plates 144. The rods 112 do not swing over the bearing plates 144 until the bicycle 10 is angularly displaced generally 45 degrees (as when turning) relative to the trailer 26.

When the bicycle 10 is being ridden while trailing the trailer 26 therebehind, the stand 102 is in its raised inoperative solid line position illustrated in FIG. 1 and the trailer 26 will lean with the bicycle. However, the bicycle may be forwardly and upwardly or forwardly and downwardly inclined relative to the trailer 26 because of the pivot connection at 150. Further, when the bicycle is turned more than 45 degrees relative to the trailer 26, the lower ends of the rods 112 swing over the corresponding, downwardly curved edges of the bearing plates 144. Of course, such angulation of the bicycle 10 relative to the trailer 26 is carried out only when the bicycle is moving very slowly. Once the rods 112 have swung over the bearing 144, the rider of the bicycle 10 may execute a sharp turn at slow speeds without fear of falling over and, in fact, the bicycle and trailer combination may be brought to a complete stop. Also, the rider of the bicycle 10 may dismount, navigate the bicycle 10 until it is inclined greater than 45 degrees relative to the trailer 26 and then proceed to unload or load the trailer 26 without fear of either the bicycle 10 or the trailer 26 falling over. Of course, when the trailer 26 is not coupled to the bicycle 10, the stand 102 is utilized to maintain the trailer 26 upright.

Figure 8:
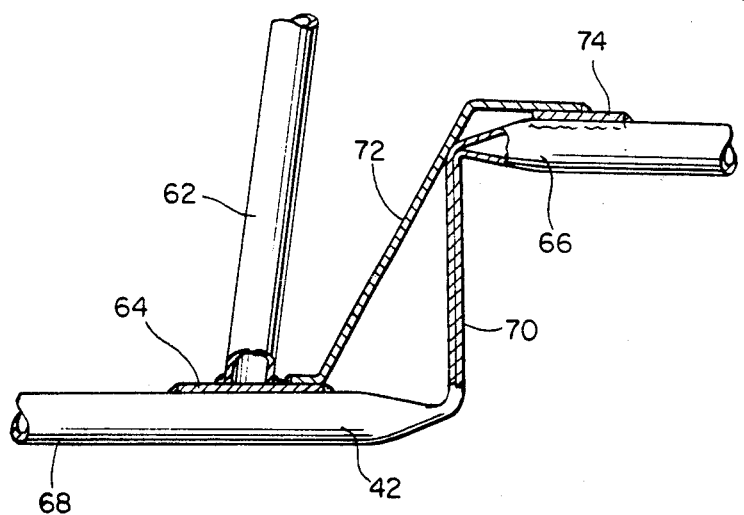
FIG. 8 is a fragmentary enlarged side elevational view of a rear lower portion of the trailer frame with parts thereof being broken away and illustrated in vertical section.
Figure 9:
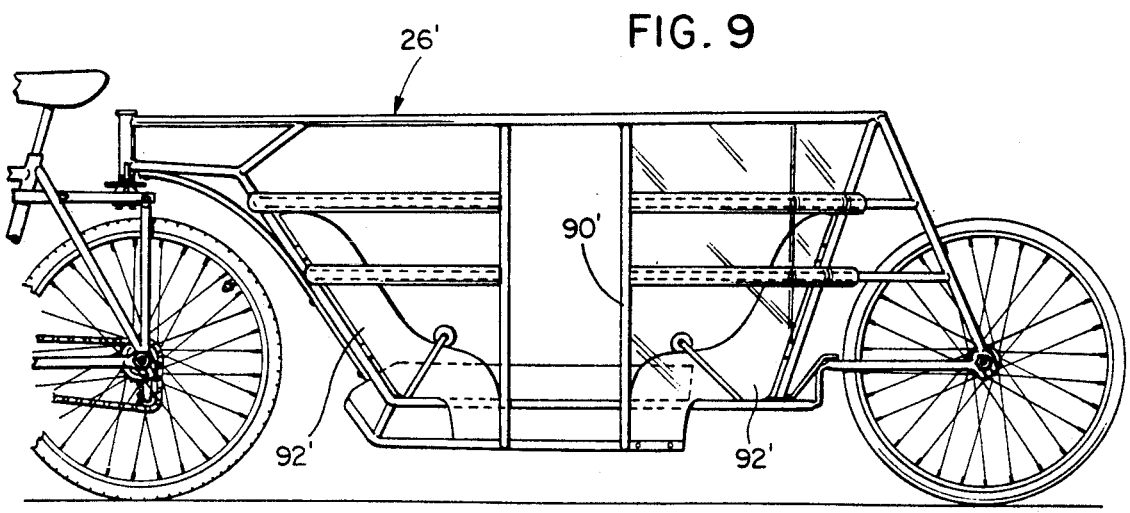
FIG. 9 is a side elevational view similar to FIG. 1, but illustrating a second form of trailer specifically designed to support two small children or infants therefrom.

With attention now invited more specifically to FIG. 8 of the drawings, a second form of trailer is referred in general by the reference numeral 26', the trailer 26' being substantially identical to the trailer 26, except that the protected area 90' of the trailer 26' corresponding the protective area 90 encloses two seats 92' corresponding to the seat 92. Thus, the trailer 26' is slightly elongated in the center section thereof to accommodate the two seats 92'.

These together with other objects and advantages which will become subsequently apparent reside in the details of construction and operation as more fully hereinafter described and claimed, reference being had to the accompanying drawings forming a part hereof, wherein like numerals refer to like parts throughout.

What is claimed as new is as follows:

1. A trailer for transport of small loads to be protected against impact in the event of upset of said trailer, said trailer including a main frame having front and rear ends, said front end including a forwardly directed upper tongue portion, said rear end including lower, rear opposite side mounting portions between which a transverse axle assembly is removably supported having a support wheel journaled thereon between said mounting portions, said frame including opposite side, front-to-rear extending lower frame portions having rear ends from which said mounting portions are supported and front ends, a forward upwardly and forwardly inclined frame portion including a lower end joining the front ends of said lower frame portions, said forward inclined frame portion including an upper end anchored to said upper tongue portion, rear upwardly and forwardly inclined opposite side portions having lower ends anchored to said mounting portions and upper ends, an upper longitudinal frame portion having a rear end to which the upper ends of said rear upwardly and forwardly inclined opposite side portions are secured and a front end connected to said tongue portion, a rear, forwardly and downwardly inclined rear frame portion having an upper end secured to and extending downwardly from the rear end of said upper longitudinal frame portion and a lower end connected between said front-to-rear extending lower frame portions forward of said wheel, at least one pair of opposite side, intermediate height, front-to-rear extending protective bars including laterally inwardly directed front and rear end portions anchored to a mid-height portion of said forward, upwardly and forwardly inclined frame portion and mid-height portions of said rear, upwardly forwardly inclined opposite side portions, respectively, the space defined between said protective bars forward of said rear, forwardly and downwardly inclined rear frame portion and above said opposite side front-to-rear extending lower frame portions defining a volume area in which to receive a load to be protected against impact in the event of upset of said trailer.

2. The trailer of claim 1 wherein said protective bars include longitudinal mid-portions which are protectively padded, at least on the inward facing surfaces thereof.

3. The trailer of claim 1 including a young child's seat mounted low within said volume area between said protective bars.

4. The trailer of claim 3 wherein said seat includes a child's weight supporting portion disposed at an elevation below the axis of rotation of said support wheel.

5. The trailer of claim 3 including side panels mounted from said longitudinal mid-portions of said protective bars said panels extending downward to the lower extremities of said seat and projecting upwardly above said seat.

6. The trailer of claim 1 including splash shield means supported from and extending downwardly along and rearwardly beneath said front inclined frame portion and at least the front ends of said front-to-rear extending lower frame portions, respectively.

7. The trailer of claim 1 wherein the forward portion of said tongue portion includes a generally vertical sleeve in which to rotably receive an upstanding pivot shank pivotally mounted at its lower end from an upper rear portion of an attendant bicycle for oscillation above an horizontal axis transverse to said bicycle.

8. In combination, a bicycle including an upper rear frame portion, an upstanding pivot shank pivotally mounted at its lower end from said frame portion for oscillation about an horizontal axis transverse to said bicycle, a trailer aligned with said bicycle, said trailer including a longitudinal frame having journaled rear support wheel means and an upper forward tongue portion defining an upstanding sleeve journaled on said pivot shank, said upper rear frame portion including fixed, front and rear upwardly facing bearing surfaces spaced to the front and rear, respectively, of said shank, said tongue portion including opposite side downwardly facing bearing surfaces spaced between said front and rear upwardly facing bearing surfaces and laterally outward of the opposite sides of said sleeve, said downwardly facing bearing surfaces only after said bicycle has been angled, in a horizontal plane, relative to said trailer, said downwardly facing bearing surfaces being spaced only slightly above said upwardly facing surfaces when disposed over the latter.

9. The combination of claim 8 wherein said upwardly facing bearing surfaces are generally arcuate in plan and arc ends of said upwardly facing bearing surfaces are curved at least slightly downwardly.

10. The combination of claim 8 wherein said trailer includes rear opposite side mounting portions between which a transverse axle assembly is removably supported from which said rear support wheel means is journaled between said mounting portions, said frame including opposite side, front-to-rear extending lower frame portions having rear ends from which said mounting portions are supported and front ends, a forward upwardly and forwardly inclined frame portion including a lower end joining the front ends of said lower frame portions, said forward inclined frame portion including an upper end anchored to said upper tongue portion, rear upwardly and forwardly inclined opposite side portions having lower ends anchored to said mounting portions and upper ends, an upper longitudinal frame portion having a rear end to which the upper ends of said rear upwardly and forwardly inclined opposite side portions are secured and a front end connected to said tongue portion, a rear, forwardly and downwardly inclined rear frame portion having an upper end secured to and extending downwardly from the rear end of said upper longitudinal frame portion and a lower end connected between said front-to-rear extending lower frame portions forward of said wheel, at least one pair of opposite side, intermediate height, front-to-rear extending protective bars including laterally inwardly directed front and rear end portions anchored to a mid-height portion of said forward, upwardly and forwardly inclined frame portion and mid-height portions of said rear, upwardly forwardly inclined opposite side portions, respectively, the space defined between said protective bars forward of said rear, forwardly and downwardly inclined rear frame portion and above said opposite side front-to-rear extending lower frame portions defining a volume area in which to receive a load to be protected against impact in the event of upset of said trailer.

11. The combination of claim 10 wherein said protective bars include longitudinal mid-portions which are protectively padded, at least on the inward facing surfaces thereof.

12. The combination of claim 11 including a young child's seat mounted low within said volume area between said protective bars.

13. The combination of claim 12 wherein said seat includes a child's weight supporting portion disposed at an elevation below the axis of rotation of said support wheel.

14. In combination, a bicycle including an upper rear frame portion, first upstanding pivot means pivotally mounted at its lower end from said frame portion for oscillation about an horizontal axis transverse to said bicycle, a trailer aligned with said bicycle, said trailer including a longitudinal frame having journaled rear support wheel means and an upper forward tongue portion defining second upstanding pivot means journaled relative to said first pivot means, said upper rear frame portion including fixed, front and rear upwardly facing bearing surfaces spaced to the front and rear, respectively, of said first upstanding pivot means, said tongue portion including opposite side downwardly facing bearing surfaces spaced between said front and rear upwardly facing bearing surfaces and laterally outward of the opposite sides of said second upstanding pivot means and which are swingable over said upwardly facing bearing surfaces only after said bicycle has been angled, in a horizontal plane, relative to said trailer, said downwardly facing bearing surfaces being spaced only slightly above said upwardly facing surfaces when disposed over the latter.

15. The combination of claim 14 wherein said trailer longitudinal frame defines a volume area forward of said journaled rear support wheel means bound at its front and rear by a forwardly and upwardly inclined front frame portion and a forwardly and downwardly inclined rear frame portion, respectively, at its top by an upper longitudinal frame portion extending between upper ends of said front and rear frame portions and at its bottom by front-to-rear extending lower frame means connected between lower ends of said front and rear frame portions, a young child's seat mounted low within said volume area.

16. The combination of claim 15 wherein said seat includes a child's weight supporting portion disposed at an elevation below the axis of rotation of said support wheel.

* * * * *